Aug. 6, 1935.    L. E. GREINER, JR    2,010,589
CLINICAL THERMOMETER AND METHOD OF MAKING THE SAME
Original Filed July 30, 1928
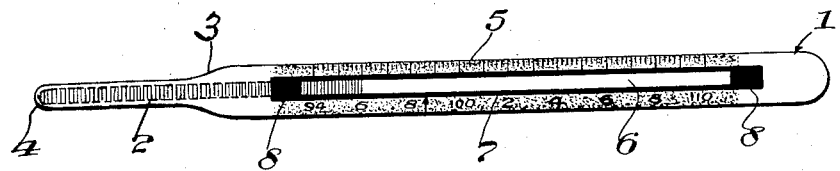
Inventor
Leopold E. Greiner Jr.
by his Attorney Patented Aug. 6, 1935

2,010,589

UNITED STATES PATENT OFFICE 2,010,589

CLINICAL THERMOMETER AND METHOD OF MAKING THE SAME

Leopold E. Greiner, Jr., New York, N. Y.

Original application July 30, 1928, Serial No. 296,152. Divided and this application October 5, 1929, Serial No. 397,476

5 Claims. (Cl. 73—52)

This invention relates to thermometers and to the method of making the same, particularly to the clinical and chemical type of thermometer, the object of the invention being to improve this class of thermometers thereby to facilitate the reading thereof, the present application being a division of my application bearing Serial No. 296,152 and filed July 30, 1928.

Clinical thermometers are provided with a very restricted bore for the thread-like passage of the mercury in its column, which is difficult for even skilled persons to accurately read, especially in a poor light, and consequently mistakes are frequently made in the reading thereof. Various attempts have been made to overcome this objectionable feature, but, owing to the small size of the instrument, this difficulty has not been entirely eliminated, even though it has been the general practice to provide such thermometers with a magnifier.

Therefore, it is the object of the present improvement to provide a thermometer of the class described so constructed as to facilitate the reading thereof and as far as possible prevent mistakes in such reading, and to do this in a simple, inexpensive and practical manner which will not interfere with the commercial production or sale of the article.

In the drawing accompanying and forming part of this specification—

The figure is a view of one form of this improved thermometer.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawing, since the invention is capable of other embodiments, and that the phraseology which I employ is for the purpose of description and not of limitation.

The thermometer, in a general way, comprises a stem 1 of glass having a mercury bore or passage 2 and the usual constricted portion 3 communicating with the mercury bulb 4. The thermometer is provided with the usual degree marking 5 which may be applied in any suitable way, the thermometer being suitably frosted so as to leave a magnifying portion of clear glass 6— and in the present instance this frosting is applied after the degree marking has been applied—and all three sides of the thermometer or only two sides facing the magnifying portion or prism may be frosted, as may be desired. It has heretofore been the practice to frost the thermometers prior to the application of the degree marks, but in the present improved thermometer I find it practical to frost the instrument after these degree marks have been applied.

On each side of the prism or magnifying portion I apply a colored border or margin line 7, preferably red, these parallel border lines terminating at the ends in similar transverse, colored border lines 8, thus forming a boxed-in prism or magnifying portion, rendering the reading of the mercury very distinct since this provides a clearly defined portion through which the mercury column can readily be seen, as the prismatic edges of the magnifying portion are thus clearly outlined along both sides and also at the termini thereof.

These parallel lines along the sides and ends may be engraved or cut with a suitable cutting tool or otherwise formed and thereafter they are filled with a suitable colored pigment, preferably red, thus very materially defining the position of the mercury and facilitating the reading thereof.

In practice, I preferably apply the colored border subsequent to the frosting for the reason that if the pigment or border is applied before the frosting, the latter would chip the edges and parts of the pigment would break away and drop out so that it would have to be repaired, thus increasing expense and time in the manufacture of the thermometer. Furthermore, by applying the pigment after the frosting, any rough edges left by the frosting are concealed by the pigment.

From the foregoing it will be observed that the magnifying portion of the thermometer is very clearly defined by the colored border lines at the opposite sides and ends of this magnifying portion of the thermometer, thereby materially facilitating the proper reading thereof.

It is to be understood by describing in detail herein any particular form, structure or arrangement, that it is not intended to limit the invention beyond the terms of the several claims or the requirements of the prior art.

In practice the colored ends preferably have greater transverse width than the colored border lines along the sides and are shown as of block formation. Thus the magnifying portion of the thermometer is completely boxed in by the colored border lines at the sides and ends, which, as stated, very materially facilitates the reading of the thermometer and prevents errors.

By frosting the thermometer subsequent to the application of the scale or etching thereof, numerous advantages result. Among these is that the thermometer is more easily handled and is less expensive to make. Cleaner work also results and the hazard of uneven etching of the scale is eliminated, whereas, when the etching takes place after the frosting, the scale is frequently unevenly etched and at times, thermometers have to be discarded but, by frosting subsequently to the etching of the scale, this unevenness is avoided and the necessity of removing any part of the frosting is also eliminated.

As hereinbefore stated, by frosting the thermometer subsequently to the application of the scale or etching thereof, cleaner work results and the hazard of uneven etching of the scale is eliminated. The reason for these phenomena are that if the frosting is done before the etching of the scale, the rough surface so frosted will wear the point of the tool rapidly, in fact, too rapidly, resulting in uneven cutting of the wax surface and subsequent uneven etching of parts exposed to the action of the acid, whereas, if the frosting is done subsequently to the etching, the result is clean-cut scales because the etching cuts through the glazed surface evenly and consequently the frosting applied over the etching does not spread or in any other way mar the engraving.

Having thus explained the nature of my said invention and described a way of constructing and using the same, although without attempting to set forth all of the forms in which it may be made or all of the modes of its use, I claim:

1. A clinical thermometer formed of glass and having a prismatic or magnifying portion for the mercury column and provided with degree markings and having a plurality of its sides contiguous to the magnifying portion and including the area covered by the degree markings frosted thereover, whereby the magnifying portion is isolated.

2. A clinical thermometer formed of glass and having a prismatic or magnifying portion for the mercury column, and provided with degree markings and having a plurality of its sides contiguous to the magnifying portion and including the area covered by the degee markings frosted thereover, whereby the magnifying portion is isolated, and said thermometer having a colored pigment over such frosted portion and bordering the magnifying portion, thereby to facilitate the reading of the thermometer.

3. A clinical thermometer formed of glass and having a prismatic or magnifying portion for the mercury column and provided with degree markings and having a plurality of its sides contiguous to the magnifying portion and including the area covered by the degree markings frosted thereover, whereby the magnifying portion is isolated, and said thermometer having a colored pigment over such frosted portion and bordering the magnifying portion both at the sides and ends thereof with the ends having greater transverse width than the sides, thereby to facilitate the reading of the thermometer.

4. The steps in the method of making clinical thermometers formed of glass and having a prismatic or magnifying portion for the mercury column and provided with degree markings which comprise forming the degree markings; subsequently frosting a plurality of the sides of the thermometer, contiguous to the magnifying portion including the area covered by the degree markings, while isolating the magnifying portion.

5. The steps in the method of making clinical thermometers made of glass and having a prismatic or magnifying portion for the mercury column and provided with degree markings which comprise forming the degree markings; subsequently frosting a plurality of the sides of the thermometer, contiguous to the magnifying portion including the area covered by the degree markings, while isolating the magnifying portion and then forming a border for the magnifying portion with colored pigment to facilitate the reading of the thermometer.

LEOPOLD E. GREINER, Jr.